(12) United States Patent
Grieb et al.

(10) Patent No.: US 10,384,513 B2
(45) Date of Patent: Aug. 20, 2019

(54) HOUSING FOR A VENTILATION, HEATING, AND/OR AIR CONDITIONING SYSTEM

(71) Applicant: MAHLE International GmbH, Stuttgart (DE)

(72) Inventors: Andreas Grieb, Stuttgart (DE); Thorsten Moellert, Stuttgart (DE)

(73) Assignee: MAHLE International GmbH, Stuttgart (DE)

( * ) Notice: Subject to any disclaimer, the term of this patent is extended or adjusted under 35 U.S.C. 154(b) by 1050 days.

(21) Appl. No.: 14/470,473

(22) Filed: Aug. 27, 2014

(65) Prior Publication Data
US 2015/0065027 A1    Mar. 5, 2015

(30) Foreign Application Priority Data
Aug. 27, 2013   (DE) .................. 10 2013 217 082

(51) Int. Cl.
*B60H 1/00*    (2006.01)

(52) U.S. Cl.
CPC ..... *B60H 1/00457* (2013.01); *B60H 1/00514* (2013.01); *B60H 1/00535* (2013.01)

(58) Field of Classification Search
CPC ............ B60H 1/00457; B60H 1/00541; B60H 1/00535; F24F 13/0263; F24F 13/06; F24F 113/082; B29C 44/025
USPC ........ 454/143, 156, 903, 906, 330; 249/121, 249/122, 124, 128; 52/742.1
See application file for complete search history.

(56) References Cited

U.S. PATENT DOCUMENTS

| 4,266,470 A * | 5/1981 | Schroeder ............. F24F 13/068 454/297 |
| 4,373,665 A | 2/1983 | Dietzsch |
| 4,733,739 A | 3/1988 | Lorenz et al. |
| 6,971,474 B2 * | 12/2005 | Prosser .............. B60H 1/00564 181/198 |
| 7,540,321 B2 * | 6/2009 | Simmet ................ B60H 1/0005 165/103 |
| 8,685,302 B2 * | 4/2014 | Kowal ...................... B64C 1/40 181/214 |
| 2002/0162965 A1 * | 11/2002 | Okada ............... H01L 27/14806 250/370.1 |
| 2003/0022617 A1 * | 1/2003 | Gebke .................. B01D 46/008 454/306 |
| 2004/0229559 A1 * | 11/2004 | Gebke ................. F24F 13/0218 454/306 |
| 2010/0240294 A1 * | 9/2010 | Goupil, Jr. ......... B60H 1/00514 454/160 |

FOREIGN PATENT DOCUMENTS

| DE | 28 56 031 A1 | 7/1980 |
| DE | 29 30 677 A1 | 1/1981 |
| DE | 34 41 176 A1 | 5/1986 |

(Continued)

Primary Examiner — Helena Kosanovic
(74) Attorney, Agent, or Firm — Muncy, Geissler, Olds & Lowe, P.C.

(57) ABSTRACT

A housing for a ventilation, heating, and/or air conditioning system of a motor vehicle, wherein the housing is made of multiple parts and forms at least one air flow path in the interior and optionally has at least one heat exchanger, whereby the housing has first regions and has second regions, whereby the first regions have a greater strength than the second regions.

16 Claims, 2 Drawing Sheets

(56) References Cited

FOREIGN PATENT DOCUMENTS

| DE | 34 47 185 A1 | 6/1986 |
| DE | 103 21 395 A1 | 12/2004 |
| DE | 10 2004 025 868 A1 | 12/2005 |
| DE | 10 2005 018 563 A1 | 10/2006 |
| DE | 10 2008 002 408 A1 | 12/2009 |

* cited by examiner

HOUSING FOR A VENTILATION, HEATING, AND/OR AIR CONDITIONING SYSTEM

This nonprovisional application claims priority under 35 U.S.C. § 119(a) to German Patent Application No. DE 10 2013 217 082.3, which was filed in Germany on Aug. 27, 2013, and which is herein incorporated by reference.

BACKGROUND OF THE INVENTION

Field of the Invention

The present invention relates to a housing for a ventilation, heating, and/or air conditioning system of a motor vehicle, whereby the housing is made of multiple parts and forms at least one air flow path in the interior and optionally has at least one heat exchanger.

Description of the Background Art

The housing of an air conditioning system or a ventilation system takes over a number of tasks. In addition to guiding one or more fluid flows, such a housing routinely contains heat exchangers, which enable the temperature control of an air flow or a fluid flow. Further, such housings have an adjusting device for influencing a fluid flow. These include in particular valve elements.

Many different embodiments for climate control system housings are known from the state of the art. The housings are designed such that they withstand stresses arising during operation without being damaged thereby. Ribbing, which reinforces especially stressed regions, is routinely provided for this purpose. Moreover, the housings have a substantially uniform wall thickness.

It is especially disadvantageous in the solutions in the conventional art that the housings are routinely made of only one material. Furthermore, the housings routinely have only one uniform wall thickness, which is configured such that the housing walls bear up against the greatest arising stresses. This results in a high housing weight, which is disadvantageous particularly with respect to vehicle $CO_2$ emissions.

SUMMARY OF THE INVENTION

It is therefore an object of the present invention to provide a housing for a ventilation, heating, and/or air conditioning system, the housing being optimized with respect to its durability and simultaneously having as low a weight as possible.

An exemplary embodiment of the invention relates to a housing for a ventilation, heating, and/or air conditioning system for a motor vehicle, whereby the housing is made of multiple parts and forms at least one air flow path in the interior and has at least one heat exchanger, whereby the housing has first regions and second regions, whereby the first regions have a greater strength than the second regions.

The housing refers in particular to the enclosure for the inner air flow paths, the valves, actuators, and the mounting for the heat exchanger disposed within the housing. The housing advantageously has openings through which one or more air flows can flow into the housing. In addition, openings are provided advantageously through which the air flow can again flow out of the housing, for example, after temperature control, mixing, or splitting.

The housing has regions which are used mainly for guiding a fluid flow and regions which accommodate other components, or by which the housing is connected to surrounding structures of the vehicle. The regions that have bearing functions, and therefore contribute to the structural integrity of the housing, advantageously have a greater strength than regions that are used solely for fluid guidance or form simple partition walls.

The first regions have greater wall thicknesses than the second regions.

In order to achieve a greater strength, greater wall thicknesses can be provided advantageously. A weight-optimized housing can be produced via a wall thickness distribution tailored to the actually occurring stresses. Designing of the housing can occur similar to the method from metalworking known as "tailored blanks." Smooth transitions between regions with a different material thickness are provided in this case. Likewise, a number of different materials can be used in one component. Preferably, the housing is made of a plastic. Forming the housing from a metallic material is also foreseeable, however.

It is especially advantageous, if the wall thicknesses of the second regions are preferably more than 20%, thereby preferably more than 40%, and thereby preferably more than 60% smaller than in the first regions.

A smaller wall thickness is particularly advantageous with respect to the total weight of the housing. A reduction of the wall thickness only in regions with a lower mechanical stress is advantageous in order not to have a negative effect on the stability of the housing.

At least one air-guiding region of the housing can be formed by at least one film and/or by at least one fabric piece.

The formation, for example, of an air channel or a partition wall of film or a fabric piece is especially advantageous, because extremely thin walls can be produced. This is helpful for the weight of the housing. Furthermore, there are more degrees of freedom with respect to the design of a wall from a film than in the case of an injected plastic. The films or fabric pieces can be provided advantageously with a binding agent and/or adhesive and/or a coating agent, as a result of which an air-tight binding or an air-tight structure can be produced.

The film and/or fabric piece can be inserted in the housing and/or cast and/or injected and/or glued in the housing and/or back-injected in the housing. Advantageously, this results in a force-fitting and/or form-fitting connection.

Films and/or fabric pieces can be advantageously inserted at the appropriate locations in the housing. To this end, for example, a temporary molding device can be provided, in which the appropriate elements can be placed. Alternatively, the films and/or fabric pieces with an adhesive, such as, for example, a synthetic resin, can be cast in the housing or back-injected in the housing. A fabric and/or film can also be advantageously injected into the housing. For this purpose, a molding device for shaping and positioning the film and/or fabric, is also provided advantageously in the manufacturing process.

It is advantageous, moreover, for the housing to have a substantially uniform wall thickness, whereby additional reinforcing components are provided in the first regions.

In order to design the regions experiencing greater mechanical stresses as sufficiently stable and, nevertheless, to keep the weight of the housing as low as possible, it can be provided advantageously that the entire wall thickness of the housing is reduced to a minimum and additional reinforcing components are provided only in the regions of greater mechanical stress. These can include, for example, fabric structures and/or films that are applied to the walls of the housing.

The fabric can be formed of carbon fibers and/or glass fibers and/or plastic fibers.

The fabrics are advantageously designed such that they have a sufficient strength and optionally are fluid-tight, in order to be able to realize their function, such as, for example, fluid guiding. Among others, aramid fibers can be used here, for example.

It is especially advantageous for the reinforcing component to be formed of films and/or fabric pieces.

The films and/or fabric pieces are advantageously glued to a region of the housing, sprayed onto it, or mounted on a housing region. In so doing, for example, a film mounted on support structures can form a very thin-walled fluid-guiding channel.

The housing can be produced at least partially in an injection molding process.

In the injection molding process, particularly housing parts made of plastic can be produced. It is especially advantageous if the housing parts have a wall thickness tailored to the stresses during operation. The housing parts fabricated of plastic advantageously can be reinforced by fabric structures and/or films or supplemented by them. Films and fabric structures can be used in particular in regions of low mechanical stress.

It is especially advantageous for the first regions and/or the second regions to have concave and/or convex wall geometries.

Concave and/or convex wall geometries are especially advantageous, because they are especially stable. In comparison with straight, smooth, flat regions, concavely or convexly curved regions are generally stable. It is especially advantageous, if the mechanically more greatly stressed regions have a concave or convex shape. Alternatively, stiffening can be carried out by beading or pockets, which can be formed on one side or also on alternating sides. These can be disposed, inter alia, in a first region. In this case, the wall thickness may also be reduced, whereby the introduced structures, such as beading or pockets or complementary beading or pockets nevertheless stiffen the structure and thus result overall in a stiffening.

In exemplary embodiment the housing in the region of a neutral fiber can have a wall thickness smaller than the wall thickness in a region adjacent to the neutral fiber.

A neutral fiber indicates the region of a body that experiences no changes in length in elastostatic stress. Naturally, the tensions there are especially low. It is therefore advantageous to provide the housing regions, lying directly at the neutral fiber of a housing section, with a smaller wall thickness than housing regions farther removed from the particular neutral fiber. Dimensioning of the wall thickness with consideration of the courses of the neutral fibers contributes to a weight reduction of the housing.

It can also be expedient for the first regions to be bearing structures of the housing, whereby the second regions form the air-guiding structures of the housing.

The first regions can be the regions that contribute to the structural integrity and stability of the housing. For example, they form the mounting points for valves, heat exchangers, actuators, and other components in the housing interior. In addition, the housing within these regions is connected to the structures surrounding the housing.

The second regions can be air-guiding or in general fluid-guiding regions. These are, for example, the flow channels in the housing interior. Partition walls can also be included here. These second regions advantageously have a lower strength than the first regions.

Furthermore, the air-guiding regions and/or the bearing structures can have a sandwich construction, whereby a fabric layer, a honeycomb layer, or a foam layer, and a fabric layer are provided successively.

Walls and housing sections in a sandwich construction are especially advantageous, because they offer a high strength at a low weight. Use of the sandwich structures therefore can reduce the overall weight of the housing. In this regard, to achieve a stable structure, a honeycomb layer can be advantageously covered by a fabric layer or a film layer.

The fabric layer can be made of glass fiber and/or plastic fiber and/or aramid fiber and/or carbon fiber. This is advantageous, because the aforementioned structures are distinguished in particular by a low weight with a simultaneously high strength and stability.

The honeycomb layer can be advantageously made of aramid paper and/or aluminum and/or plastic and/or a foam.

As an alternative to a honeycomb layer, a foam layer can also be provided. This is advantageous especially in the case of bearing structures. A structural foam such as, for example, polymethacrylimide (PMI) can be used advantageously as the foam. In an alternative embodiment, the foam can also be interspersed in addition with a honeycomb structure. Alternatively, along the force paths of the housing in the foam or adjacent to it, unidirectional bands, for example, made of carbon fiber, glass fiber, or plastic fiber, can be provided which run along the force path and provide additional stabilization.

It is especially advantageous in this regard for the air-guiding structures to have a lowest possible weight proportion and the bearing structures have the greatest possible strength.

It also to be preferred, if the air-guiding regions and/or the bearing structures have a sandwich construction, whereby a fabric layer is arranged at least on one side on a honeycomb layer or a foam layer.

This is particularly advantageous in that a still lighter structure can be produced by an only one-sided arrangement.

In an alternative embodiment of the invention, it is provided in addition that the bearing structures are formed by aluminum die casting and/or magnesium die casting, whereby the metallic structures are covered at least partially by a fabric and/or overmolded with a thermoplastic and/or surrounded by films.

Components produced in aluminum die casting or magnesium die casting are distinguished by a high strength at a low weight. For additional reinforcement, these components can be covered or surrounded with fabric and/or films, as has already been described above. Such fabric and/or films can also be inserted in the metallic components and fixed there, for example, by an adhesive. Alternatively, the metallic components can be overmolded with a thermoplastic.

A supporting framework can be provided, whereby the supporting framework is formed of profile elements. In an alternative embodiment of the invention, it can be provided that the supporting framework is surrounded at least partially by a fabric and/or by a thermoplastic and/or by a film. In so doing, the fabric and/or thermoplastic and/or film can be arranged both on the outwardly facing side of the supporting framework and on the inwardly facing side of the supporting framework.

A supporting framework can be a frame, produced from a plurality of profile elements, or a skeleton, which can be surrounded by fabric pieces and/or films, in order to form a closed housing. Advantageously, only a section of the housing can be formed by such a supporting framework.

In an exemplary embodiment, the supporting framework can be formed by hollow profile elements, such as, for example, I, T, or U profiles. In addition to the I, T, or U profiles, tubes with a circular or oval cross section can also be used, for example. In this regard, the supporting framework can be designed such that primarily the walls outwardly limiting the housing are formed by the surrounded supporting framework or also the inner structure of the housing. The supporting framework can be configurerd advantageously of multiple parts as well in order to assure a simpler assembly.

According to an embodiment of the invention, it can be provided that the first regions of the housing form regions that are acted upon by greater mechanical stresses in comparison with the second regions.

In this regard, in particular mechanical stresses are meant that during operation act on the housing of the climate control system.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
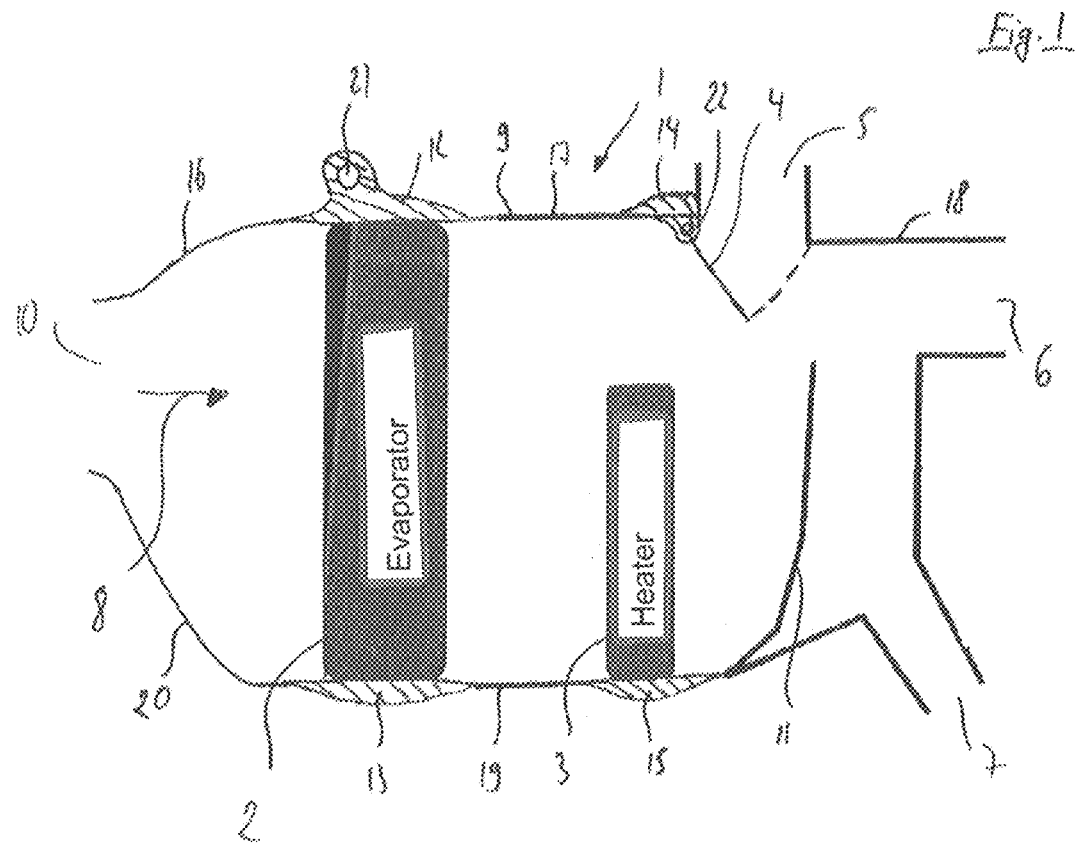
FIG. 1 shows a schematic view of the housing of a climate control system with an evaporator, heater, air outlet openings, an air inlet opening, and a valve.

FIG. 1 shows a schematic view of a climate control system 1. Climate control system 1 has in its interior, by way of example, an evaporator 2 and a heater 3, which are disposed in an air flow section 8. Furthermore, a valve 4, which can close an air outlet opening 5, is disposed in the interior of climate control system 1. To this end, valve 4 is mounted rotatable at housing 9 of the climate control system.

Housing 9 furthermore has an air inlet opening 10 and two air outlet openings 6, 7. A partition wall 11, which guides the air flow in the top part of housing 9, is disposed in the air flow direction downstream of heater 3.

The illustrated components in climate control system 1 are only exemplary. More or fewer heat exchangers, valves, air inlet openings, or air outlet openings can also be provided in alternative embodiments. Likewise, the number and arrangement of the partition walls in the interior of climate control system 1 can vary. As a result, further air flow sections and flow paths can be formed in the interior of the housing.

Housing 9 has first regions 12, 13, 14, and 15, which have a much greater wall thickness than the other regions 16 to 20. Evaporator 2 is accommodated between first regions 12 and 13. Furthermore, first region 12 has a mounting point 21, which is used for connecting housing 9 to structures (not shown here) in the vehicle.

First region 14 is arranged adjacent to air outlet opening 5 and in the interior has connecting point 22 for valve 4. Valve 4 is mounted rotatable around said connecting point 22. A further first region 15 is used for accommodating heater 3.

First regions 12 to 15 are included in the bearing structures of housing 9, forming connecting points for components 2, 3, 4, disposed in housing 9, and/or functioning as outer connecting points 21 for structures surrounding housing 9. During operation, the mechanical stresses at these regions are greater than, for example, in second regions 16 to 20, which further form housing 9.

First regions 12 to 15 in FIG. 1 have a convex curvature outward. This design is exemplary. In alternative embodiments, concave courses can also be provided or wall regions running parallel to one another.

The second regions 16 to 20 are primarily formed with thin walls and take over mainly the air-guiding tasks in climate control system 1 shown in FIG. 1. In other words, they form air flow section 8 primarily in the interior of housing 9. The second regions 16 to 20 therefore advantageously have an especially thin-walled design in order to keep the weight of housing 9 as minimal as possible. Housing 9 is preferably made of multiple parts so that easy assembly is possible.

Housing 9 is advantageously made of plastic, fabric, a film, or metal. Coated walls can be used which, for example, provide fabric-surrounded honeycomb structures. Alternatively, foams can also be used to produce a stable and the lightest housing 9 possible.

The elements forming housing 9 can be formed similar to the "tailored blanks" method, already known from metalworking. This means that the wall thickness of housing 9 at each location is tailored to the mechanical stresses actually arising during later operation. This allows for a smooth transition between first regions 12 to 15 with a thicker wall thickness and second regions 16 to 20 with a smaller wall thickness.

Partition wall 11 that has only an air-guiding function, can be formed from a supporting framework, for example, which is surrounded by a fabric and/or film. An especially light yet stable partition wall 11 can be produced in this way. The supporting framework can include advantageously one or more profile elements are joined together to form a frame or another supporting structure.

In an alternative embodiment, the first regions can also be produced with an increased material thickness in which a suitable reinforcing component is applied to a thin-walled housing. To this end, for example, fabric structures or films can be glued onto the housing. Alternatively, the housing can be surrounded by a fabric and/or film at appropriate locations. The description for FIG. 3 contains further embodiments in this regard.

Figure 2:
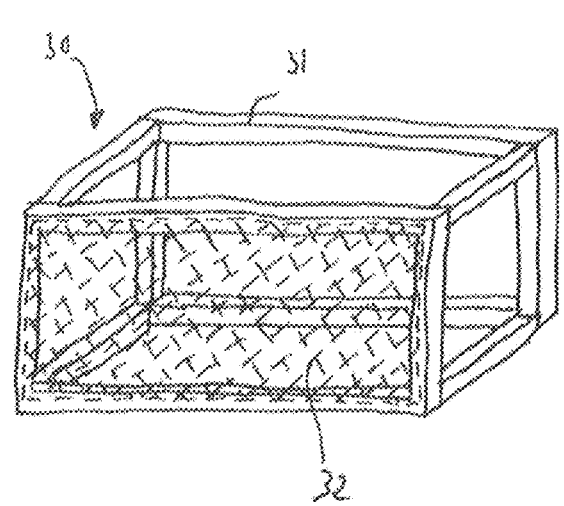
FIG. 2 shows a perspective view of a supporting framework made of profile elements, whereby a surface of the supporting framework is covered or surrounded by a material.

FIG. 2 shows by way of example a rectangular supporting framework 30, made of a plurality of profile elements 31. In this case, profile elements 31 are advantageously glued, screwed, or soldered together or, for example, connected to one another by plug connections.

Any supporting framework geometries can be produced by suitable dimensioning of profile elements 31 and a suitable positioning to one another.

Supporting framework 30 in FIG. 2 is covered, at least on the surface facing the viewer, with a material 32. Material 32 here can be, for example, a film and/or fabric, as has already been described further above. An at least partially or completely closed supporting framework 30 can be produced in this way, which forms, for example, an air flow section in the interior. In an alternative embodiment, the supporting framework can also be covered or surrounded partially as in FIG. 2 and covered partially with a wall made of a plastic or a metallic material.

The structure closing the housing outwardly, as well as sections of the housing, disposed in the interior of the housing, such as, for example, air channels, can be formed over a supporting framework 30.

Figure 3:
FIG. 3 shows a partial view of a housing segment, whereby the housing has first regions and second regions, whereby the first regions have a greater wall thickness than the second regions.

FIG. 3 shows a partial view of a housing 40, whereby two second regions 45, 46 and two first regions 41, 43 are shown. The left first region 41 is formed by a reinforcing component 42, which was applied to thin-walled housing 40. Reinforcing component 42 is preferably glued to housing 40 or housing 40 is back-injected with reinforcing component 42. Alternatively, such a first region with a greater wall thickness can also be achieved by the selective influencing of an injection molding tool.

The right first region 43 is formed by reinforcing component 44, which is disposed on both sides of housing 40. Housing 40 is thus surrounded both on the upward facing surface and on the downward facing surface by reinforcing component 44.

Reinforcing component 42 and 44, as already described, could be formed by films, fabric structures, or also by a thermoplastic.

Housing 40 can be made of a plastic or, for example, be a part produced in aluminum die casting or magnesium die casting.

Figure 4:
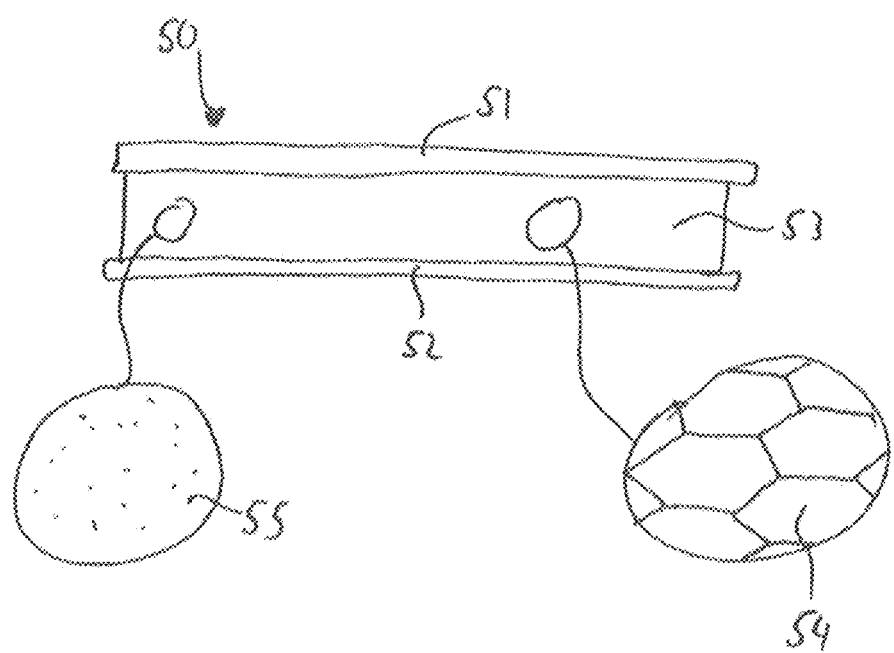
FIG. 4 shows a further partial view of a housing segment, whereby the housing is formed with a sandwich-like construction.

FIG. 4 shows a partial view of a housing 50, which is produced in a sandwich-like construction. In this case, both outer layers 51, 52 are each formed by a fabric layer. Middle layer 53 in FIG. 4 is either formed by a honeycomb structure 54, as shown on the right, or by a foam layer 55, as shown on the left.

FIG. 4 is an exemplary illustration. Advantageously, either a honeycomb-like structure 54 or a foam layer 55 is provided. In an alternative embodiment, however, a mixed structure of honeycomb 54 and foam 55 can also be provided. In further alternative embodiments, a layer 51 or 52 can also be applied only on one side to honeycomb-like structure 54, foam layer 55, or the mixed structure. Layer 51, 52 can be disposed both on the outwardly facing surface of the housing and on the inwardly facing surface of the housing.

The features of the exemplary embodiments of FIGS. 1 to 4 can be combined with one another. The shown FIGS. 1 to 4 do not suggest any limiting effect. The figures are used to clarify the inventive concept and are not limiting particularly with respect to their geometry, material selection, and dimensioning.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A housing for a ventilation, heating, and/or air conditioning system of a motor vehicle, the housing comprising:
   multiple parts that form at least one air flow path in an interior;
   at least one heat exchanger;
   first wall regions;
   second wall regions, the first wall regions having a greater strength and being subjected to greater mechanical stresses than the second wall regions; and
   reinforcing components,
   wherein the reinforcing components are directly fixedly attached only to the first wall regions,
   wherein the reinforcing components are each formed by metal piece along with a film and/or a fabric piece, and
   wherein along an exterior wall of the housing in an air flow direction, one of the second wall regions is positioned between two of the first wall regions, such that air flows past a first one of the two of the first wall regions, then past the one of the second wall regions and then past a second one of the two of the first wall regions.

2. The housing according to claim 1, wherein the first wall regions have greater wall thicknesses than the second wall regions.

3. The housing according to claim 1, wherein wall thicknesses of the second wall regions are more than 20% smaller than in the first wall regions.

4. The housing according to claim 1, wherein the housing has a substantially uniform wall thickness.

5. The housing according to claim 1, wherein the fabric piece is formed of carbon fibers and/or glass fibers and/or plastic fibers.

6. The housing according to claim 1, wherein the housing is produced at least partially in an injection molding process.

7. The housing according to claim 1, wherein the first wall regions and/or the second wall regions have concave and/or convex wall geometries.

8. The housing according to claim 1, wherein the first and/or second wall regions have a substantially uniform wall thickness, which is reducible, and wherein the first and/or second wall regions are stiffened due to shaping, beading, pockets and/or complementary beading and/or pockets.

9. The housing according to claim 1, wherein the housing, in a region of a neutral fiber, has a wall thickness smaller than a wall thickness in a region adjacent to the neutral fiber.

10. The housing according to claim 1, wherein the first wall regions form bearing structures of the housing, and wherein the second wall regions form air-guiding structures of the housing.

11. The housing according to claim 10, wherein the bearing structures are formed by aluminum die casting and/or magnesium die casting, and wherein the bearing structures are covered at least partially by the fabric piece and/or are overmolded with a thermoplastic and/or surrounded by the film.

12. The housing according to claim 1, further comprising a supporting framework, the supporting framework being formed at least partially of profile elements.

13. The housing according to claim 1, wherein wall thicknesses of the second wall regions are more than 60% smaller than in the first wall regions.

14. A housing for a ventilation, heating, and/or air conditioning system of a motor vehicle, the housing comprising:
   at least one heat exchanger;
   first housing regions, wherein the first housing regions comprising a metal portion for reinforcement; and second housing regions, the first regions having a greater strength and being subjected to greater mechanical stresses than the second housing regions, wherein the second housing regions include walls of an air channel and a partition wall provided inside the air channel, the walls of the air channel and the partition wall each being formed of a film or a fabric piece that is impermeable to air, such that an entirety of the partition wall is impermeable to air, and wherein outer edges of the film or the fabric piece of each of the walls of the air channel being attached to profile elements that form an outer frame of the walls and outer edges of the film or the fabric piece of the partition wall being attached to profile elements that form an outer frame of the partition wall.

15. The housing according to claim 1, wherein the reinforcing components are attached to an exterior surface of the first wall regions.

16. The housing according to claim 15, wherein the reinforcing components are attached to the exterior surface of the first wall regions and to an interior surface of the first wall regions.

\* \* \* \* \*